(12) United States Patent
Gonthier et al.

(10) Patent No.: US 9,774,243 B2
(45) Date of Patent: Sep. 26, 2017

(54) POWER CONVERTER WITH INRUSH CURRENT LIMITATION

(71) Applicant: STMicroelectronics (Tours) SAS, Tours (FR)

(72) Inventors: Laurent Gonthier, Tours (FR); Muriel Nina, Vouvray (FR)

(73) Assignee: STMicroelectronics (Tours) SAS, Tours (FR)

( * ) Notice: Subject to any disclaimer, the term of this patent is extended or adjusted under 35 U.S.C. 154(b) by 0 days.

(21) Appl. No.: 14/956,660

(22) Filed: Dec. 2, 2015

(65) Prior Publication Data
US 2016/0301298 A1 Oct. 13, 2016

(30) Foreign Application Priority Data
Apr. 7, 2015 (FR) ...................................... 15 52987

(51) Int. Cl.
*H02M 7/19* (2006.01)
*H02M 1/32* (2007.01)
(Continued)

(52) U.S. Cl.
CPC ............... *H02M 1/32* (2013.01); *H02M 1/36* (2013.01); *H02M 7/062* (2013.01); *H02M 7/125* (2013.01);
(Continued)

(58) Field of Classification Search
CPC ........ H02M 1/32; H02M 1/36; H02M 7/1555; H02M 7/217; H02M 5/45; H02M 2001/325
(Continued)

(56) References Cited

U.S. PATENT DOCUMENTS 3,857,083 A 12/1974 Lundstrom
3,953,781 A 4/1976 Forster et al.
(Continued)

FOREIGN PATENT DOCUMENTS

EP 0633652 A2 1/1995
EP 2533409 A1 12/2012
JP 2000233092 A 8/2000

OTHER PUBLICATIONS

INPI Search Report and Written Opinion for FR 1552987 dated Feb. 4, 2016 (9 pages).
(Continued)

*Primary Examiner* — Rajnikant Patel
(74) *Attorney, Agent, or Firm* — Gardere Wynne Sewell LLP

(57) ABSTRACT

An AC/DC converter receives an AC voltage at a first terminal and a second terminal. A rectifying bridge has a first input terminal coupled via a resistive element to the first terminal and a second input terminal connected to the second terminal, with output terminals of the rectifying bridge coupled to third and fourth terminals of the converter for generating a DC voltage. A first controllable rectifying thyristor couples the first terminal to the third terminal and a second controllable rectifying thyristor couples the fourth terminal to the first terminal. The resistive element functions as an inrush protection device during a first phase when the thyristors are turned off. In a second phase, the thyristors are selectively actuated.

18 Claims, 4 Drawing Sheets

(51) Int. Cl.
  *H02M 1/36* (2007.01)
  *H02M 7/06* (2006.01)
  *H02M 7/12* (2006.01)
  *H02M 7/162* (2006.01)
  *H02M 7/515* (2007.01)
(52) U.S. Cl.
  CPC ........... *H02M 7/162* (2013.01); *H02M 7/515* (2013.01); *H02M 2001/325* (2013.01)
(58) Field of Classification Search
  USPC ......... 363/16–20, 37, 41, 54, 59, 61, 68, 89, 363/127; 323/207, 222, 225, 244, 323/282–285, 299, 316
  See application file for complete search history.

(56) References Cited

U.S. PATENT DOCUMENTS

| | | | |
|---|---|---|---|
| 4,045,722 A | 8/1977 | Tachibana | |
| 4,075,510 A | 2/1978 | Pascente | |
| 4,314,322 A | 2/1982 | Plow et al. | |
| 4,641,234 A | 2/1987 | Bonal | |
| 4,673,858 A | 6/1987 | Saito | |
| 4,837,672 A * | 6/1989 | Donze | H02M 1/10 361/87 |
| 5,468,976 A | 11/1995 | Evseev et al. | |
| 5,572,415 A * | 11/1996 | Mohan | G05F 3/24 363/126 |
| 5,621,628 A * | 4/1997 | Miyazaki | H02M 5/45 363/37 |
| 5,796,601 A | 8/1998 | Yamamoto | |
| 5,798,520 A | 8/1998 | Kuijk et al. | |
| 5,886,892 A * | 3/1999 | Radley | H02H 9/001 323/300 |
| 5,995,395 A | 11/1999 | Rivet | |
| 6,608,770 B2 * | 8/2003 | Vinciarelli | H02M 1/4208 323/222 |
| 7,078,870 B2 | 7/2006 | Bocchiola | |
| 7,394,675 B2 * | 7/2008 | Hwang | H02H 7/1225 363/142 |
| 8,653,700 B2 | 2/2014 | Busch | |
| 8,711,587 B2 * | 4/2014 | Momose | H02M 1/36 323/908 |
| 2006/0072353 A1 | 4/2006 | Mhaskar et al. | |

OTHER PUBLICATIONS

Compack thyristor module platform a new design that reduces parts and material costs with higher power density—Dec. 31, 2013—XP055245468.

Takano, H, et al: "Comparative Study of Resonant and Non-Resonant DC-DC Converter With Parasitic LC Components of High-Voltage Transformer," Conference Record of the 1998 IEEE Industry Applications Conference, 33rd IAS Annual Meeting, St. Louis, MO, Oct. 12-15, 1998, pp. 1580-1587, XP000876198.

* cited by examiner

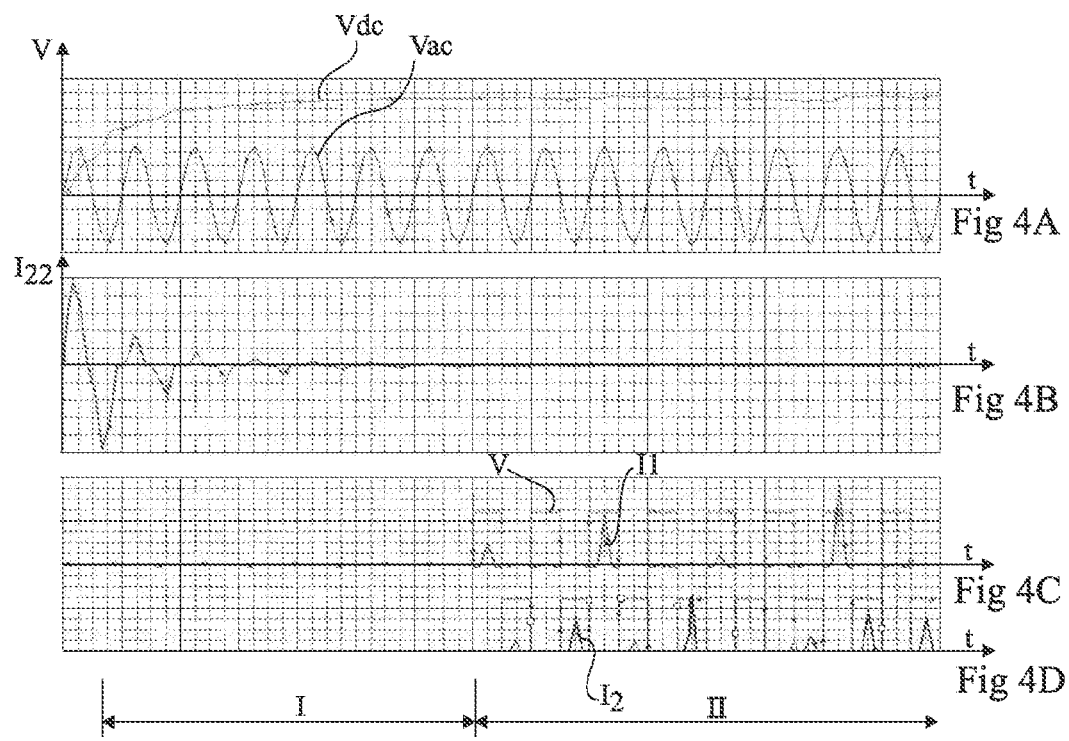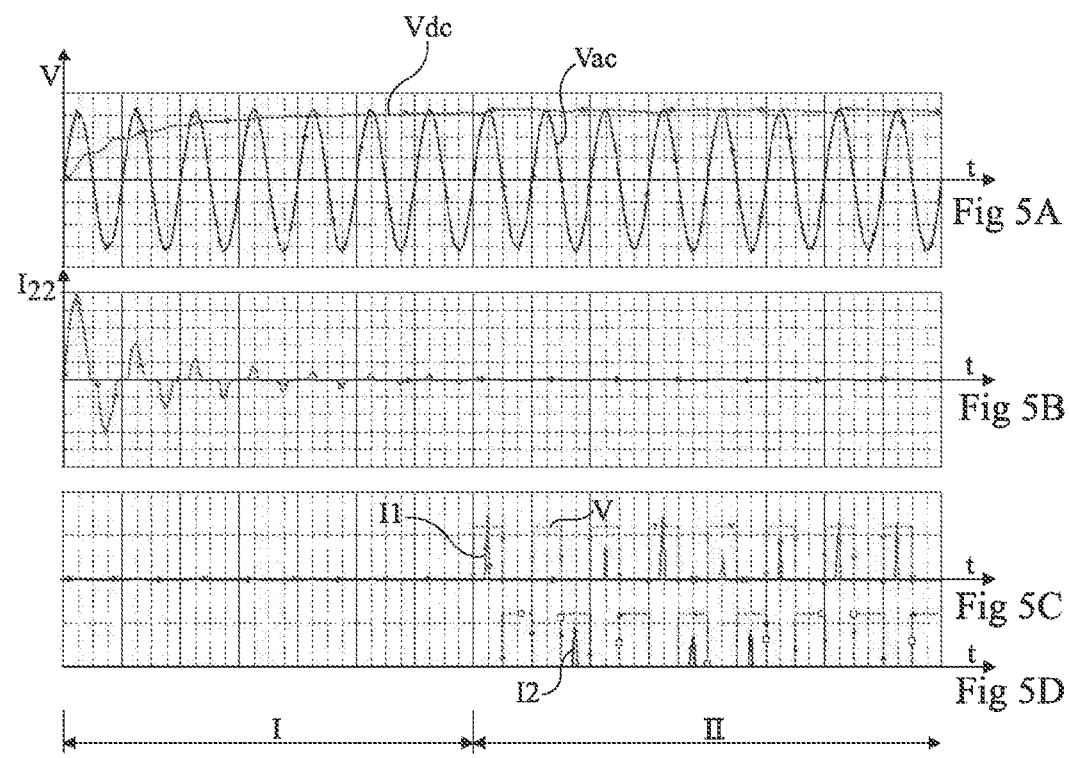

POWER CONVERTER WITH INRUSH CURRENT LIMITATION

PRIORITY CLAIM

This application claims the priority benefit of French Application for U.S. Pat. No. 1,552,987, filed on Apr. 7, 2015, the contents of which is hereby incorporated by reference in its entirety to the maximum extent allowable by law.

TECHNICAL FIELD

The present disclosure generally relates to electronic devices and, more specifically, to AC/DC converters. The present disclosure generally applies to any system using a rectifying bridge, for example, circuits for controlling electric motors, electric chargers, switched-mode power supplies, etc.

BACKGROUND

Many AC/DC converter architectures are known that are based on rectifying elements, which may be controllable (thyristors, for example) or not (diodes, for example), assembled as a rectifying bridge, powered with an AC voltage and delivering a DC voltage, this DC voltage being possibly itself converted back into an AC voltage.

The inrush current, that is, the current peaks which occur on each halfwave of the AC voltage as long as the voltage across a capacitor at the output of the rectifying bridge has not reached a sufficient level and, this, particularly, in starting phases, is generally desired to be limited.

Documents U.S. Pat. No. 6,493,255 and Japanese publication JP-H-1278258 (both incorporated by reference) describe examples of AC/DC converters.

SUMMARY

An embodiment overcomes all or part of the disadvantages of usual power converter control circuits.

An embodiment aims at providing a circuit for limiting the inrush current in a power converter.

An embodiment provides a solution compatible with a voltage-doubling function at the level of a rectifying bridge powered with the AC voltage.

Thus, an embodiment provides an AC/DC converter comprising: a first terminal and a second terminal, intended to receive an AC voltage; a third terminal and a fourth terminal, intended to supply a first DC voltage; a rectifying bridge having input terminals respectively coupled via a resistive element to the first terminal and connected to the second terminal and having output terminals respectively connected to the third, and fourth terminals; a first controllable rectifying element coupling the first terminal to the third terminal; and a second controllable rectifying element coupling the fourth terminal to the first terminal.

According to an embodiment, the rectifying elements are controlled after a starting phase where the resistive element limits inrush currents.

According to an embodiment, two series-connected capacitive elements couple the third and fourth terminals, a switch connecting the junction point of the capacitive elements to the second terminal.

According to an embodiment, the first and second rectifying elements are cathode-gate thyristors.

According to an embodiment, the first rectifying element is an anode-gate thyristor controllable by extraction of a gate current and the second rectifying element is a cathode-gate thyristor controllable by injection and/or extraction of a gate current.

According to an embodiment, the gates of the thyristors are controlled by a same transformer, excited by an AC signal.

According to an embodiment, the thyristor gates are controlled by a same transformer, excited by a periodic square-wave positive and negative signal.

BRIEF DESCRIPTION OF THE DRAWINGS

The foregoing and other features and advantages will be discussed in detail in the following non-limiting description of specific embodiments in connection with the accompanying drawings.

FIGS. 4A, 4B, 4C, and 4D illustrate, in timing diagrams, the operation of the converter of FIG. 3, in voltage doubling mode;

FIGS. 5A, 5B, 5C, and 5D illustrate, in timing diagrams, the operation of the converter of FIG. 3, in follower mode;

DETAILED DESCRIPTION

Figure 1:
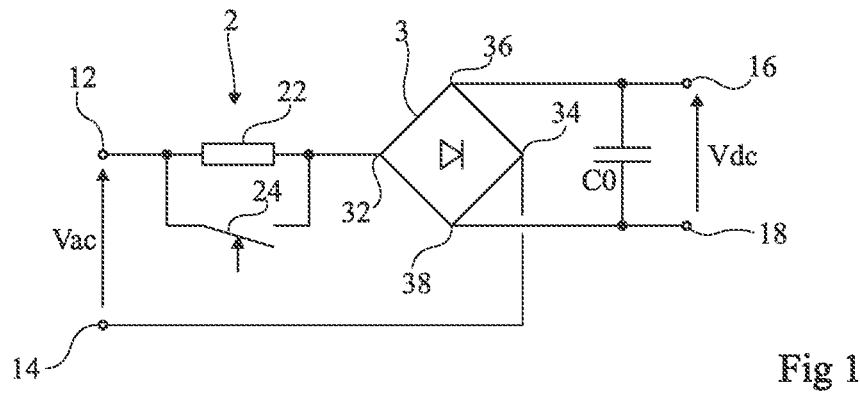
FIG. 1 schematically shows an example of a usual architecture of an AC/DC converter equipped with an inrush current limiting circuit.

The same elements have been designated with the same reference numerals in the different drawings. In particular, the structural and/or functional elements common to the different embodiments may be designated with the same reference numerals and may have identical structural, dimensional, and material properties. For clarity, only those steps and elements which are useful to the understanding of the described embodiments have been shown and will be detailed. In particular, the circuits powered by the power converter have not been detailed, the described embodiments being compatible with usual applications. In the disclosure, term "connected" designates a direct connection between two elements, while terms "coupled" and "linked" designate a connection between two elements which may be direct or via one or a plurality of other elements. When reference is made to terms "about", "approximately", or "in the order of", this means to within 10%, preferably to within 5%.

FIG. 1 schematically shows an example of an architecture of an AC/DC converter equipped with an inrush current limiting circuit.

Two input terminals 12 and 14 are intended to receive an AC voltage Vac, for example, the voltage of the electric distribution network (for example, 230 or 120 volts, 50 or 60 Hz). Terminal 12 is coupled, via an inrush current limiting assembly 2, to a first rectifying input terminal 32 of a rectifying bridge 3 (for example, fullwave) having its second rectifying input terminal 34 connected to terminal 14. Rectified outputs 36 and 38 of the bridge are respectively connected to output terminals 16 and 18, delivering a DC voltage Vdc. A storage and smoothing capacitor C0 couples terminals 16 and 18. The inrush current limiting assembly is formed of a resistor 22 coupling terminals 12 and 32 and of a switch 24 which may be controlled to short-circuit resistor 22. At the starting (capacitor C0 discharged), switch 24 is turned off and resistor 22 limits the charge current of capacitor C0. In steady state, switch 24 is turned on to short-circuit the resistor and decrease losses.

Figure 2:
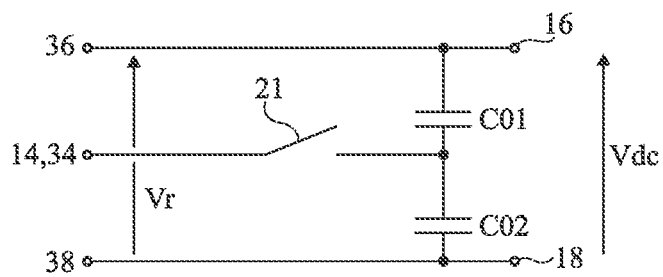
FIG. 2 schematically shows a modification of the assembly of FIG. 1 to form a voltage-doubling converter.

FIG. 2 schematically shows a modification of the assembly of FIG. 1 to form a voltage-doubling converter. Terminal 34 is coupled, via a switch 21, to a junction point of two capacitive circuit elements (capacitors C01 and C02) connecting terminals 16 and 18 (with the possibility of suppressing capacitor C0). Assuming that capacitive elements C01 and C02 have the same capacitance, voltage Vdc between terminals 16 and 18 corresponds, in steady state, approximately to twice peak voltage Vac between terminals 12 and 14.

Other solutions use controlled switches, of thyristor type, most often, as disclosed in document U.S. Pat. No. 6,493,245, to short-circuit the inrush current limiting resistor. This document describes a plurality of embodiments, either with a single thyristor, or with two thyristors. These two embodiments allow no limitation of the inrush current by the resistive element when a voltage-doubling device is connected to the circuit output. Indeed, no resistive element limits the charge current of capacitor C02 when element 21 is on.

More sophisticated solutions, such as that disclosed in document United States Patent Application Publication No. 2012/0230075 (incorporated by reference), use, between an input terminal of application of the AC voltage and the rectifying bridge, a device for controlling the bridge turn-on phase angle, that is, for selecting the time, for each halfwave of the AC voltage, from which the rectifying bridge is powered. In such a case, the starting of the converter requires a voltage source to power a circuit for controlling the phase control switch. Such current solutions require complex assemblies to accurately set the turn-on times.

In the assembly of FIG. 1, the presence of switch 24 generates losses in steady state. In practice, this switch may be formed by a triac and the losses are due to the on-state series resistance of this triac.

Figure 3:
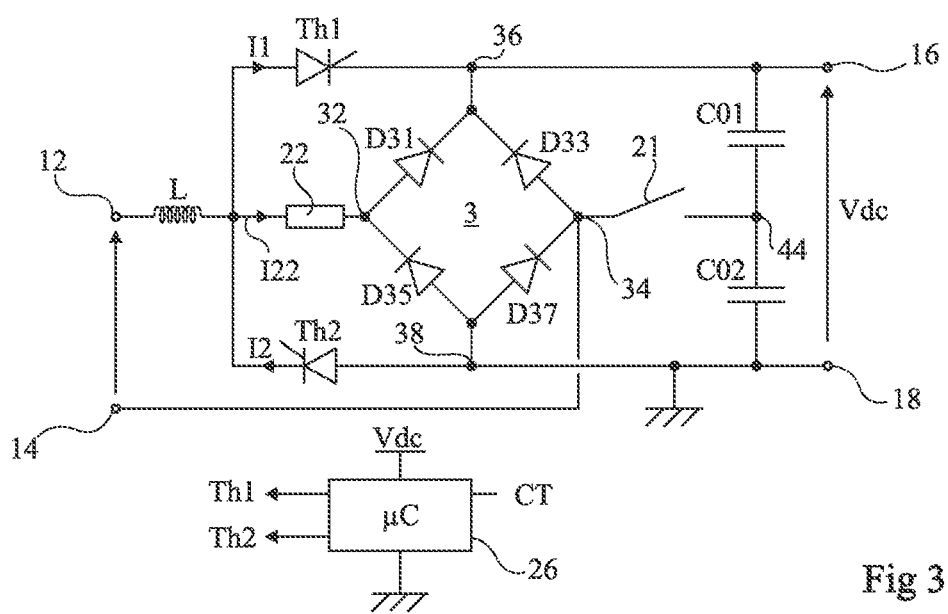
FIG. 3 schematically shows an embodiment of an AC/DC converter.

FIG. 3 schematically shows an embodiment of an AC/DC converter.

It shows a rectifying bridge 3 having input terminals 32 and 34 coupled to first and second terminals 12 and 14 of application of an AC voltage Vac and having rectified output terminals 36 and 38 connected to third and fourth terminals 16 and 18 for supplying a DC voltage Vdc. At least one capacitive element interconnects terminals 16 and 18.

Rectifying bridge 3 is, in this example, formed of four diodes D31, D33, D35, and D37. Diodes D31 and D33 respectively couple terminals 32 and 34 to terminal 36 (cathodes of diodes D31 and D33 on the side of terminal 36) and diodes D35 and D37 respectively couple terminals 32 and 34 to terminal 38 (anodes of diodes D35 and D37 on the side of terminal 38).

In the example of FIG. 3, a converter capable of operating in voltage-doubling mode or in follower mode is assumed. Accordingly, two capacitive circuit elements (capacitors C01 and C02 of a same capacitance value) are series-connected between terminals 16 and 18 and an element 21 (for example, a jumper, a switch, a relay, etc.) connecting junction point 44 of capacitive elements C01 and C02 to terminal 14 (and thus to terminal 34) are provided. When connection 21 is open (no connection between terminal 14 and node 44), bridge 3 operates in follower mode, that is, the maximum value of voltage Vdc corresponds to the peak value of voltage Vac (to within losses). When connection 21 is active, the converter operates in voltage-doubling mode, that is, the maximum value of voltage Vd corresponds approximately to twice the peak value of voltage Vac.

To achieve the inrush current limiting function at the starting of the converter, a resistive element 22 connects terminals 12 and 32. However, instead of short-circuiting this element with a bidirectional switch 24 as in FIG. 1, two controllable unidirectional rectifying elements are here provided, in practice thyristors Th1 and Th2 which couple terminal 12 to, respectively, terminal 36 and terminal 38. Thyristor Th1 has its anode on the side of terminal 12. Thyristor Th2 has its anode on the side of terminal 38.

Preferably, an inductive circuit element (inductor L) is interposed between terminal 12 and resistor 22, thyristors Th1 and Th2 being connected to the junction point of the resistor and of inductance L.

Thyristors Th1 and Th2 are controlled by an electronic circuit, for example, a microcontroller 26, in charge of generating pulses for controlling thyristors Th1 and Th2 and controlling the gates of these thyristors via one or two insulated couplers (not shown in FIG. 3), in optical, magnetic, or capacitive technology. Microcontroller 26 receives different set points CT or measurements to generate the pulses at the right times according, among others, to the needs of the load powered by the converter.

FIGS. 4A, 4B, 4C, and 4D illustrate, in timing diagrams, the operation of the converter of FIG. 3, in voltage doubling mode (switch 21 on). FIG. 4A shows examples of shape of voltage Vac and of the obtained voltage Vdc. FIG. 4B illustrates the shape of current I22 in resistor 22. FIGS. 4C and 4D illustrate the shapes of current I1 and I2 in thyristors Th1 and Th2.

In a first phase I, as long as voltage Vdc has not reached its steady state value, that is, approximately twice the peak value of voltage Vac, thyristors Th1 and Th2 remain off. Capacitors C01 and C02 then charge through resistor R22 and bridge 3 in non-controlled fashion. During positive halfwaves, the current flows from terminal 12, through optional inductance L, through resistor 22, diode D31, capacitor C01, and switch 21 to reach terminal 14. During negative halfwaves, the current flows from terminal 14, through switch 21, capacitor C02, diode D35, resistor 22, and optional inductance L to reach terminal 12.

In a second steady-state phase II where resistor 22 is no longer necessary to limit inrush currents, resistor 22 is, for each halfwave of voltage Vac, short-circuited by one or the other of thyristors Th1 and Th2 according to the sign of the halfwave. During positive halfwaves, the current flows from terminal 12, through optional inductance L, through thyristor Th1, capacitor C01, and switch 21 to reach terminal 14. During negative halfwaves, the current flows from terminal 14, through switch 21, capacitor C02, thyristor Th2, and optional inductance L to reach terminal 12.

FIGS. 5A, 5B, 5C, and 5D illustrate, in timing diagrams, the operation of the converter of FIG. 3, in follower mode (switch 21 off). FIG. 5A shows examples of shapes of voltage Vac and of the obtained voltage Vdc. FIG. 5B illustrates the shape of current I22 in resistor 22. FIGS. 5C and 5D illustrate the shapes of current I1 and I2 in thyristors Th1 and Th2.

As compared with the operation illustrated in relation with FIGS. 4A to 4D, a difference is that the amplitude of voltage Vdc does not exceed the peak value of voltage Vac.

In a first phase I, as long as voltage Vdc has not reached its steady state value, that is, approximately the peak value of voltage Vac, thyristors Th1 and Th2 remain off. Capacitors C01 and C02 then charge through resistor R22 and bridge 3 in non-controlled fashion. During positive halfwaves, the current flows from terminal 12, through optional inductance L, through resistor 22, diode D31, capacitor C01, capacitor C02, and diode D37 to reach terminal 14. During negative halfwaves, the current flows from terminal 14, through diode D33, capacitor C01, capacitor C02, diode D35, resistor 22, and optional inductance L to reach terminal 12.

In a second steady-state phase II where resistor 22 is no longer necessary to limit inrush currents, resistor 22 is as in doubling mode, for each halfwave of voltage Vac, short-circuited by one or the other of thyristors Th1 and Th2 according to the sign of the halfwave. During positive halfwaves, the current flows from terminal 12, through optional inductance L, through thyristor Th1, capacitor C01, capacitor C02, and diode D37 to reach terminal 14. During negative halfwaves, the current flows from terminal 14, through diode D33, capacitor C01, capacitor C02, thyristor Th2, and optional inductance L to reach terminal 12.

Thyristors Th1 and Th2 are, in phases II, preferably phase-angle controlled to be made conductive in decreasing phases of rectified voltage Vac, according to the charge level of the capacitor(s).

In the representation of FIGS. 4C, 4D, 5C and 5D, the amplitudes of current I1 and I2 according to the halfwaves depend on the downstream power consumption of the converter and illustrate an arbitrary example.

Figure 6:
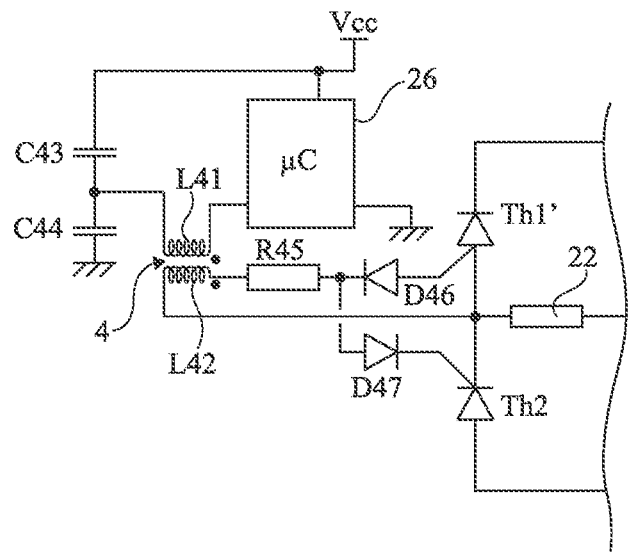
FIG. 6 partially shows another embodiment of a converter.

FIG. 6 partially shows another embodiment of a converter.

As compared with the embodiment of FIG. 3, thyristor Th1 is replaced with an anode-gate thyristor Th1'. In this case, the two thyristors may be controlled from a same auxiliary power supply by using a pulse transformer while, in the case of FIG. 3, it is necessary to generate currents from voltages which do not have the same reference, which requires an insulated coupler different for each thyristor Th1 and Th2.

In the example of FIG. 6, a first winding L41 of a transformer 4 receives a pulse control from a microcontroller 26 powered with a DC voltage Vcc. The other end of winding L41 is coupled to the junction point of two capacitive elements C43 and C44 between power supply terminal Vcc and the ground. A second winding L42 of transformer 4 has one end connected to the junction point of thyristors Th1' and Th2, and its other end coupled to the gates of thyristors Th1' and Th2. This coupling is performed via an optional series resistor R45 and two diodes D46 and D47 respectively connecting winding L42 (or resistor R45) to the gates of thyristors Th1' and Th2. The anode gate of thyristor Th1' is connected to the anode of diode D46 while the cathode gate of thyristor Th2 is coupled to the cathode of diode D47, the cathode of diode D46 and the anode of diode D47 being connected to winding L42 (or to resistor R45).

The circuit of FIG. 6 thus enables to inject both a gate current into thyristor Th2, and to extract a gate current from thyristor Th1'. The two thyristors are thus controlled each time an AC pulse (of +Vcc/2−Vcc/2 type) is applied to primary L41 of transformer 4.

If the two controls are desired to be distinguished, for example, by only controlling thyristor Th1' during positive halfwaves of voltage Vac, and only controlling thyristor Th2 during negative halfwaves of voltage Vac, this is possible by applying across L41 respectively during these two types of halfwaves, a signal of type −Vcc/0 (to turn on thyristor Th1'), and a signal of type +Vcc/0 (to turn on thyristor Th2). Since such signals having a DC component, transformer 4 should not have a saturable magnetic material to avoid the saturation of this material and ensure the proper operation of the control signal transfer. A transformer with no magnetic core (or "air transformer") may thus for example be used. To generate control signals +Vcc/0 and −Vcc/0 across winding L41, the dividing bridge formed by C43 and C44 is replaced with a so-called push-pull assembly, formed of two transistors.

According to another embodiment, thyristors Th1' and Th2 are selected to both operate by extraction of current from their gate. Thus, a same so-called negative power supply voltage Vdd (that is, having its high level, VDD, connected to terminal 32, itself coupled to terminal 12 of the mains) is sufficient to power the two thyristors Th1' and Th2. This same power supply may be used to power the gates of triacs having their control reference connected to terminal 32. Such triacs would be useful to control AC current loads powered with voltage Vac.

Figure 7:
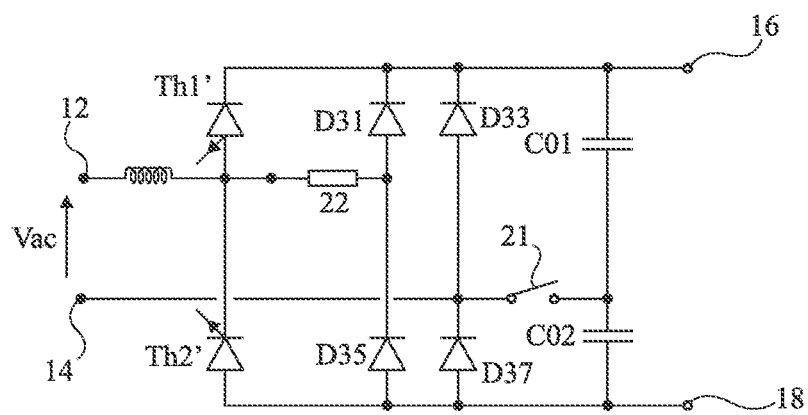
FIG. 7 shows still another embodiment of a converter.

FIG. 7 shows still another embodiment of a converter.

As compared with the embodiment of FIG. 3, thyristor Th1 is replaced with an anode-gate thyristor Th1'. Further, thyristor Th2 is replaced with a thyristor Th2' controllable by a negative gate current, that is, by drawing current from its gate. In this case, both thyristors may be controlled from a same so-called negative secondary power supply VDD (that is, having its high level, VDD, coupled to mains terminal 12).

The operation of the assemblies of FIGS. 6 and 7 can be deduced from the operation discussed in relation with FIG. 3.

The forming of a cathode-gate thyristor controllable by a negative current is known per se.

Figure 8:
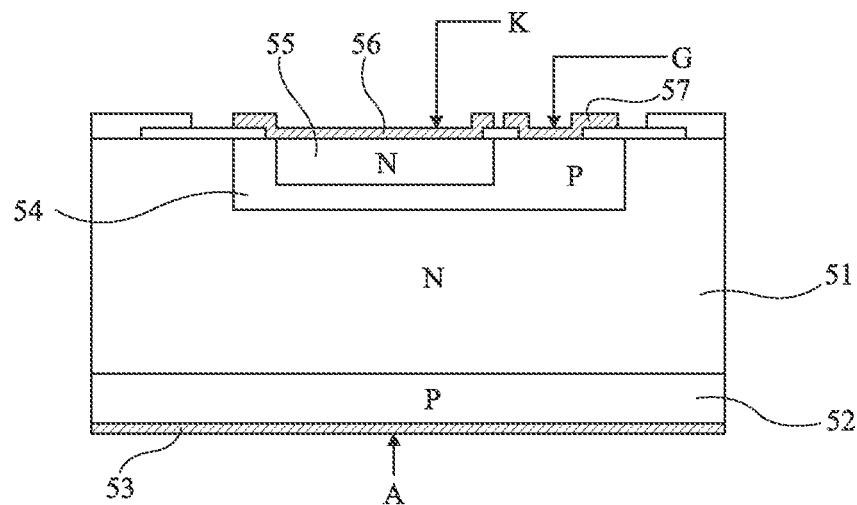
FIG. 8 is a simplified cross-section view of an embodiment of a cathode-gate thyristor having a positive gate current.
Figure 9:
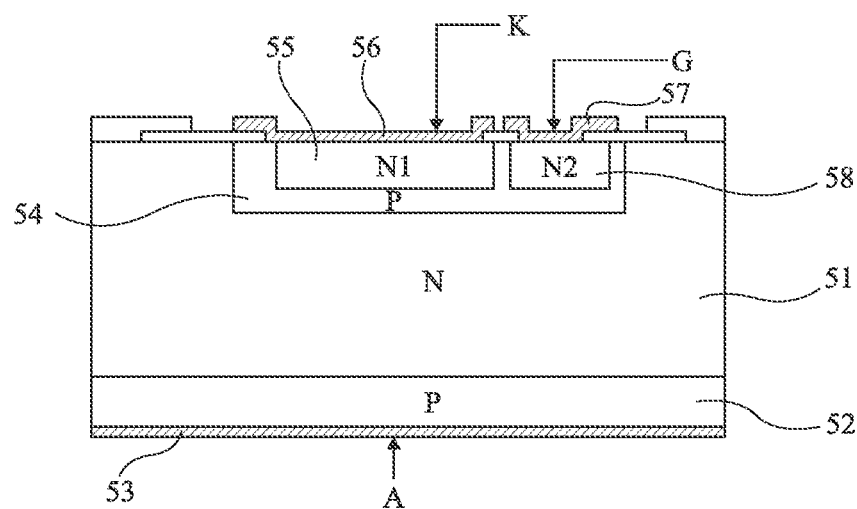
FIG. 9 is a simplified cross-section view of an embodiment of a cathode-gate thyristor having a negative gate current.

FIGS. 8 and 9 are simplified cross-section views of embodiments of cathode-gate thyristors respectively with a positive gate current or a current injection (most current case) and with a negative gate current or a current extraction.

According to these examples, the thyristor is formed in an N-type substrate 51. At the rear surface, a P-type layer 52 defines an anode region, anode electrode A being obtained by a contacting metallization 53 of region 52. A P-type well 54 is formed at the front surface. An N-type cathode region 55 (N1) is formed in well 54 and a contacting metallization 56 of this region 55 defines cathode electrode K.

In the case of FIG. 8, a gate contact 57 is formed at the level of P-type well 54. Thus, the injection of a gate current starts the thyristor if the latter is properly biased (positive anode-cathode voltage).

In the case of FIG. 9, an N-type region 58 (N2) is added under gate contact 57. Region 58 allows a turning-on by a negative gate current (that is, flowing from cathode K to gate G) by allowing an electron injection into N-type substrate 51, which corresponds to the base of the NPN-type bipolar transistor formed by regions 52-51-54.

As a variation, region 58 may be divided at least in two to allow a direct contact of the P region (54) to the gate. Such a variation, called "short-circuit hole", enables to improve the immunity to voltage transients of the thyristor and thus allows the control by a positive gate current (that is, flowing from gate G to cathode K).

Various embodiments have been described. Various alterations, modifications, and improvements will occur to those skilled in the art. For example, the thyristors may be replaced with triacs, each in series or not with a diode. Further, the practical implementation of the embodiments which have been described is within the abilities of those skilled in the art based on the functional indications given hereabove. In particular, the programming of the microcontroller depends on the application and the described embodiments are compatible with usual applications using a microcontroller or the like to control a converter.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An AC/DC converter, comprising:
a first terminal and a second terminal configured to receive an AC voltage;
a third terminal and a fourth terminal configured to supply a first DC voltage;
a rectifying bridge having input terminals respectively coupled via a resistive element to the first terminal and connected to the second terminal, and having output terminals respectively connected to the third and fourth terminals;
a first controllable rectifying element coupling the first terminal to the third terminal; and
a second controllable rectifying element coupling the fourth terminal to the first terminal;
wherein the first rectifying element is an anode-gate thyristor controllable by extraction of a first gate current and the second rectifying element is a cathode-gate thyristor controllable by either injection or extraction of a second gate current; and
wherein gates of the anode-gate thyristor and the cathode-gate thyristor are controlled by a same transformer circuit which is excited by an AC signal.

2. The converter of claim 1, wherein the first and second controllable rectifying elements are controlled to be selectively turned on after a starting phase where the resistive element limits inrush currents is completed.

3. The converter of claim 1, further comprising:
two series-connected capacitive elements couple the third and fourth terminals, and
a switch connecting a junction point between the capacitive elements to the second terminal.

4. The converter of claim 1, wherein the first and second rectifying elements are cathode-gate thyristors.

5. An AC/DC converter, comprising:
a first terminal and a second terminal configured to receive an AC voltage;
a third terminal and a fourth terminal configured to supply a first DC voltage;
a rectifying bridge having input terminals respectively coupled via a resistive element to the first terminal and connected to the second terminal, and having output terminals respectively connected to the third and fourth terminals;
a first controllable rectifying element coupling the first terminal to the third terminal; and
a second controllable rectifying element coupling the fourth terminal to the first terminal;
wherein the first rectifying element is an anode-gate thyristor controllable by extraction of a first gate current and the second rectifying element is a cathode-gate thyristor controllable by either injection or extraction of a second gate current; and
wherein gates of the anode-gate thyristor and the cathode-gate thyristor are controlled by a same transformer circuit which is excited by a periodic square wave positive and negative signal.

6. The converter of claim 5, wherein the first and second controllable rectifying elements are controlled to be selectively turned on after a starting phase where the resistive element limits inrush currents is completed.

7. The converter of claim 5, further comprising:
two series-connected capacitive elements couple the third and fourth terminals, and
a switch connecting a junction point between the capacitive elements to the second terminal.

8. The converter of claim 5, wherein the first and second rectifying elements are cathode-gate thyristors.

9. An AC/DC converter, comprising:
a first input terminal and a second input terminal;
a rectifying bridge having a first input coupled via a resistive circuit element to the first terminal and a second input connected to the second input terminal and having a first output and a second output;
a first thyristor having an anode terminal coupled to the second output and a cathode terminal coupled to the first input;
a second thyristor having an anode terminal coupled to the first input and a cathode terminal coupled to the first output; and
a control circuit configured to generate control signals for application to gate terminals of the first and second thyristors.

10. The converter of claim 9, wherein the control circuit is configured for operation in a first phase wherein the control circuit configures both the first and second thyristors to be turned off with the resistive circuit element functioning to limit inrush current and further configured for operation in a second phase wherein the control circuit configures the first and second thyristors to be selectively turned on to bypass the resistive circuit element.

11. The converter of claim 9, further including an inductor coupled in series with the input terminal.

12. The converter of claim 9, further including:
a first inductor coupled between the input terminal and the gate terminals of the first and second thyristors; and
a second inductor magnetically coupled to the first inductor and electrically coupled to an output of the control circuit.

13. The converter of claim 12, further including:
a first diode coupled between the first inductor and the gate terminal of the first thyristor; and
a second diode coupled between the first inductor and the gate terminal of the second thyristor.

14. The converter of claim 9, further comprising a first output terminal and a second output terminal coupled, respectively, to the first and second outputs of the rectifying bridge.

15. The converter of claim 9, wherein the first and second thyristors are both cathode gate type thyristors.

16. The converter of claim 9, wherein the first thyristor is a cathode gate type thyristor and the second thyristor is an anode gate type thyristor.

17. The converter of claim 9, wherein the control circuit drives gates of the first and second thyristors using a same transformer circuit which is excited by an AC signal.

18. The converter of claim 9, wherein the control circuit drives gates of the first and second thyristors using a same transformer circuit which is excited by a periodic square wave positive and negative signal.

\* \* \* \* \*